Oct. 11, 1932.

L. PIGNANELLI

SHOE

Re. 18,615

Original Filed June 14, 1928

INVENTOR:
Luigi Pignanelli
BY
Pierre James
ATTORNEY

Reissued Oct. 11, 1932

Re. 18,615

UNITED STATES PATENT OFFICE

LUIGI PIGNANELLI, OF TACOMA, WASHINGTON

SHOE

Original No. 1,737,679, dated December 3, 1929, Serial No. 285,386, filed June 14, 1928. Application for reissue filed June 15, 1931. Serial No. 544,648.

This invention relates to improvements in shoes.

The object of my improvement is to produce a shoe wherein the rear portion is constructed to furnish thereat rigidity sufficient to so support the arch and maintain the shoe in proper shape and the front portion somewhat after the manner of a turned shoe to afford flexibility to yield to the movements of the wearer's foot when walking.

Another object is to provide a shoe of relatively light weight, neat appearance, strong, durable and inexpensive to manufacture.

Other objects and advantages of the invention will appear in the following description.

The invention consists, generally stated, in the production of a shoe wherein the usual methods are followed with regard to its rear portion—that is with the lower edge of the upper interposed between the insole and the outsole and secured thereto by tacks and sewed seams or other known means, while the fore portion of the shoe is made without any insole, but utilizes a ligament or ligaments adhesively connected to the inturned edge of the upper at opposite sides of the shoe and which with such edge are secured to the outsole.

The invention further consists in the novel construction, adaptation and combination of the parts as hereinafter described and claimed.

In the accompanying drawing—

Figure 1:
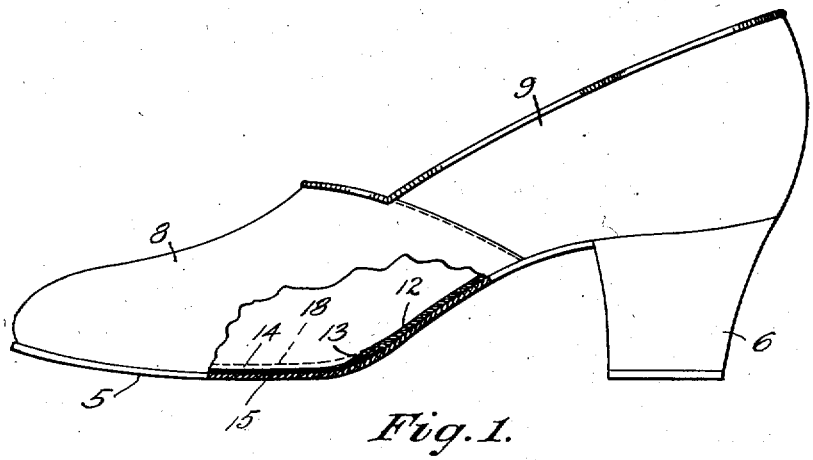
Figure 2:
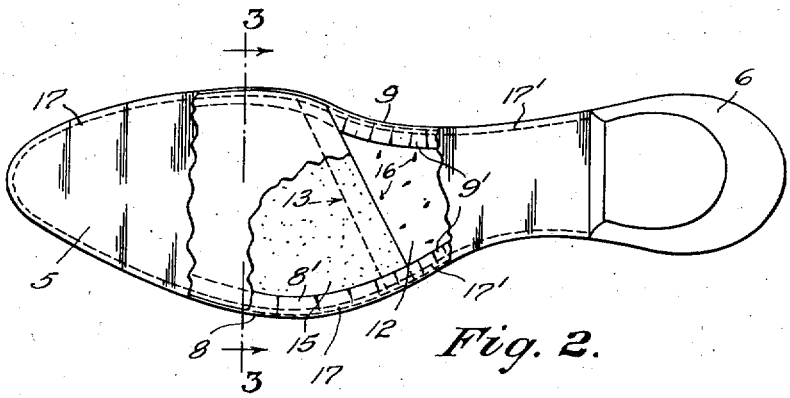
Figure 3:
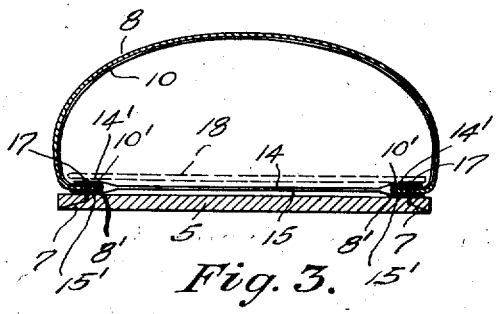

Figure 1 is a side elevation of a McKay sewed shoe embodying the present invention, a portion of the shoe being broken away, and shown partly in longitudinal vertical section; Figure 2 is an underside plan view of Figure 1 with parts broken away to disclose the internal arrangement of the shoe parts; and Figure 3 is a transverse sectional view on line 3—3 of Figure 2.

In said drawing the reference numeral 5 represents the outsole of the shoe, said sole extending the entire length of the shoe, or from the plane of the front surface of the heel 6 to the front end of the shoe.

Adjacent its edge, at the sides and at the toe, said sole is provided in its underside with a stitch receiving channel 7.

The shoe upper may consist of a single piece of leather, or several pieces as shown, of which 8 denotes the vamp and 9 the quarters secured together and having inturned lower edges, denoted by $8^1$ and $9^1$, respectively.

Said vamp and quarters are provided respectively with linings 10 of cloth or the like, which linings are formed to provide inturned lower edges such as $10^1$.

All of the above described parts are or may be similar to what have been heretofore used in the art. According to the present invention, a short insole 12 is used, the same extending from the rear end of the shoe, where it serves as a heel seat, and terminates in a front edge 13 located at or about the ball of a foot.

In lasting, the vamp and associated lining edges at each side of the shoe and about the toe are inserted between two layers 14 and 15 of fabric or an equivalent, of approximately the shape of the fore part of the usual insole, and are secured to both layers by a suitable adhesive so as to constitute with the vamp a continuous wrapping extending circuitously about the fore part of the last.

The insole 12 is next positioned upon the last below the inturned edges $9^1$ of the quarters, after which the outsole is applied and secured to said insole by means of lasting tacks 16.

Thereupon the last is removed from the shoe which is sewed upon a machine, of known construction, to produce a seam of thread stitches which, as at 17 in the fore part of the shoe, unite the sole to both the vamp edge $8^1$ and the overlying edges $14^1$ and $15^1$ of the respective fabric ligaments above and below the same; and, as at $17^1$ in the rear part of the shoe, along the opposite edges of the insole the stitches unite the outsole, the insole, the intervening edges $9^1$ of the quarters, and also the rear portion of the vamp and the edges thereof which extend beyond the front edge 13 of the insole.

The heel is then secured by glue and nails in a well known manner to the insole. A sock lining, not shown, is used as customary, within the shoe to protect the wearer's foot from becoming chafed.

The above described shoe is of light weight, strong and with a relatively rigid rear part and a flexible fore part.

Where a greater thickness of material is desired under the foot in the fore part of the shoe an ancillary insole of leather, indicated by dotted line 18, having the shape of the fore portion of the usual insole, may be inserted within the shoe above the upper ligament 14 and in front of the insole 12, as shown.

The ancillary insole, however, is not sewed nor otherwise secured to the outsole, nor is it fastened to the upper and therefore does not detract from the flexibility of the fore part of the shoe, but serves supplementary to the referred to sock lining to cover the seam 17.

What I claim, is,—

1. In a shoe, the combination of an outsole provided with a channel in its underside, an upper having its lower edge extending inwardly above said outsole, fabric located above and below said lower edge for coupling the same at opposite sides of the shoe and cooperating with the upper to encircle the foot at the fore part of the shoe, and an insole located above said inturned edge at the rear part of the shoe, the front end of said insole being located at or about the ball of the foot, said outsole being sewed by a seam extending upwardly from said channel throughout the length of the shoe to the inturned edge of the upper and also to the insole and to said fabric at the rear and fore parts respectively of the shoe.

2. In a shoe, the combination of an insole for the rear portion of the shoe, an outsole, an upper and a lining therefor, two layers of fabric provided in the fore part of the shoe in front of said insole, the upper and the lining thereof having their lower edges turned inwardly between said layers and secured thereto by an adhesive substance, said outsole being secured to the insole by lasting tacks and secured to the upper by a line of stitches extending about the outer edge of the outsole.

3. In a shoe, in combination with an outsole, and an upper the lower inturned edges of which are secured to the outsole, an insole for the heel and shank only of the shoe secured to the outsole, and a flexible non-extensible layer of material for the fore part of the shoe having its forward and lateral edges secured to the inturned edges of the upper across the toe and the ball portions of the shoe to serve as a binder for securely connecting the opposite inturned edges of the upper across said ball and toe portions together.

4. In a shoe, in combination with an outsole, and an upper the lower inturned edges of which are secured to the outsole, an insole for the heel and shank only of the shoe secured to the outsole, and a flexible layer of fabric for the fore part of the shoe having its forward and lateral edges secured to the inturned edges of the upper across the toe and the ball portions of the shoe to serve as an inextensible binder for securely connecting the opposite inturned edges of the upper across said ball and toe portions together.

In testimony whereof I hereunto affix my signature this 13th day of June, 1931.

LUIGI PIGNANELLI.